(12) United States Patent
Hashimoto

(10) Patent No.: US 6,671,574 B1
(45) Date of Patent: Dec. 30, 2003

(54) POSITION DETECTING APPARATUS AND LIBRARY APPARATUS

(75) Inventor: Koujiro Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/339,187

(22) Filed: Jan. 9, 2003

(30) Foreign Application Priority Data

Aug. 30, 2002 (JP) ........................................ 2002-253146

(51) Int. Cl.$^7$ ............................ G06F 7/00; G05B 19/04; G05B 19/18; G05B 15/00; G05B 19/00

(52) U.S. Cl. ........................ 700/215; 700/218; 700/254; 700/259; 907/47; 356/124

(58) Field of Search ................................. 700/214, 215, 700/218, 220, 254, 259; 901/46, 47; 356/124, 127; 414/273, 274; 382/286, 287

(56) References Cited

U.S. PATENT DOCUMENTS

| | | | |
|---|---|---|---|
| 490,877 | A | 1/1893 | Lovell et al. |
| 4,979,135 | A | 12/1990 | Moy |
| 5,303,034 | A | 4/1994 | Carmichael et al. |
| 5,329,469 | A | 7/1994 | Watanabe |
| 5,366,896 | A | 11/1994 | Margrey et al. |
| 5,418,732 | A | 5/1995 | McFadin |
| 5,661,287 | A | 8/1997 | Schaefer et al. |
| 5,790,338 | A | 8/1998 | Kanai et al. |
| 5,946,160 | A | 8/1999 | Ohashi |
| 5,963,514 | A | 10/1999 | Kanetsuku et al. |
| 6,008,964 | A | * 12/1999 | Goodknight et al. ......... 360/92 |
| 6,078,846 | A | 6/2000 | Greer et al. |
| 6,101,455 | A | 8/2000 | Davis |
| 6,366,707 | B1 | * 4/2002 | Gardner et al. ............. 356/124 |
| 6,574,529 | B1 | * 6/2003 | Lundeen et al. ............ 700/218 |

FOREIGN PATENT DOCUMENTS

| | | |
|---|---|---|
| JP | 61-098410 | 5/1986 |
| JP | 61-227240 | 10/1986 |
| JP | 61-270094 | 11/1986 |
| JP | 64-002889 | 1/1989 |
| JP | 01-176795 | 7/1989 |
| JP | 02-103407 | 4/1990 |
| JP | 02-276725 | 11/1990 |
| JP | 04-283086 | 10/1992 |
| JP | 04-370704 | 12/1992 |
| JP | 05-114641 | 5/1993 |
| JP | 05-280927 | 10/1993 |
| JP | 06-259536 | 9/1994 |
| JP | 08-119411 | 5/1996 |
| JP | 08-210816 | 8/1996 |
| JP | 09-251309 | 9/1997 |

(List continued on next page.)

*Primary Examiner*—Gene O. Crawford
(74) *Attorney, Agent, or Firm*—Greer, Burns & Crain, Ltd.

(57) ABSTRACT

A position detecting apparatus and a library apparatus that have a flag and a sensor for detecting the flag can shorten time required to perform a position detecting process. The position detecting apparatus comprises a flag 50 and a CCD sensor 36, the flag 50 being provided in a cabinet 23 or a magnetic tape recording-playing apparatus 24 and being formed of a first white part 51 and a second white part 52 with high reflectivity of light and a black part 53 with low reflectivity of light, and the CCD sensor 36 being provided in a medium holding mechanism 30 and detecting optically the first white part 51, the second white part 52 and the black part 53 in the flag 50. The first white part 51 and the second white part 52 are formed as a pair of right isosceles triangles and are positioned symmetrically with respect to an axis of the flag. Furthermore, the CCD sensor 36 is formed of a line type CCD sensor so as to detect the flag 50 linearly. Accordingly, based on a detection result by the CCD sensor 36, the position detecting apparatus detects a relative position of the medium holding mechanism 30 to the cabinet 23 or the magnetic tape recording-playing apparatus 24.

7 Claims, 16 Drawing Sheets

FOREIGN PATENT DOCUMENTS

| | | |
|---|---|---|
| JP | 09-269813 | 10/1997 |
| JP | 10-006264 | 1/1998 |
| JP | 10-134458 | 5/1998 |
| JP | 10-202569 | 8/1998 |
| JP | 11-058273 | 3/1999 |
| JP | 11-198068 | 7/1999 |
| JP | 11-254362 | 9/1999 |
| JP | 2001-210692 | 8/2001 |

* cited by examiner

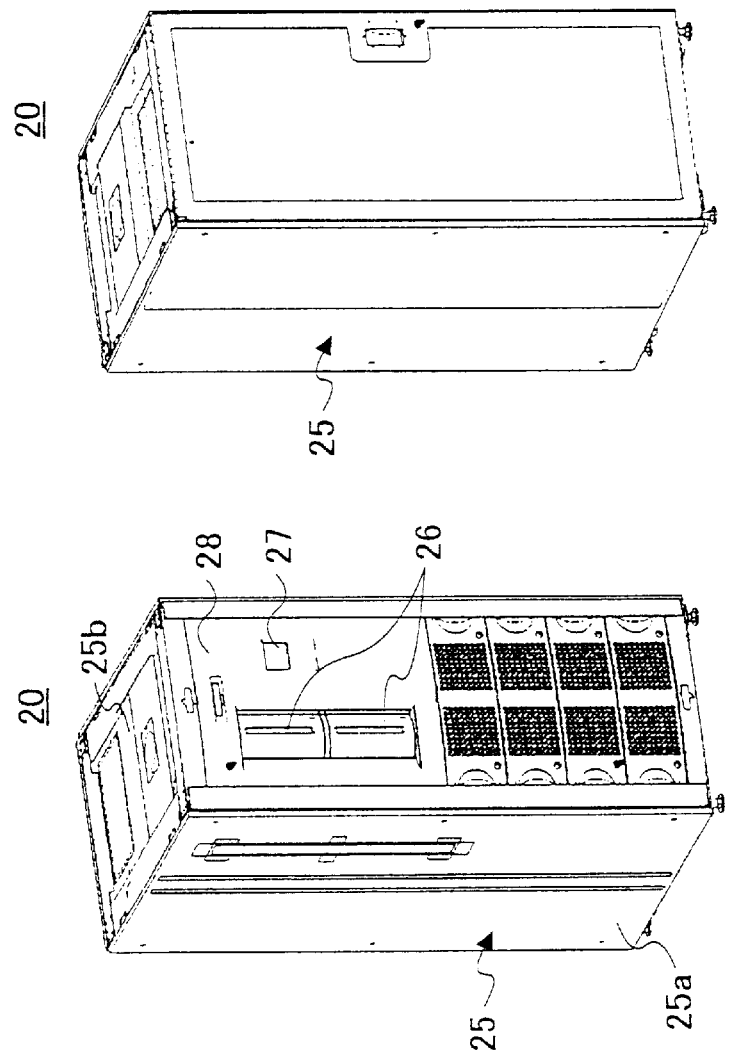

FIG.8A
FIG.8B
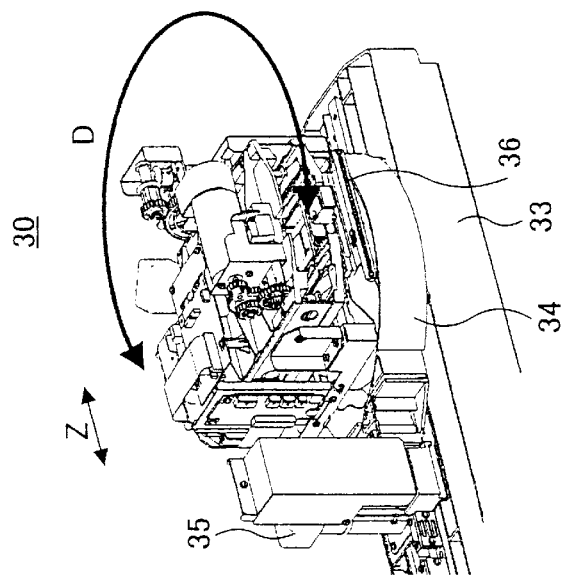
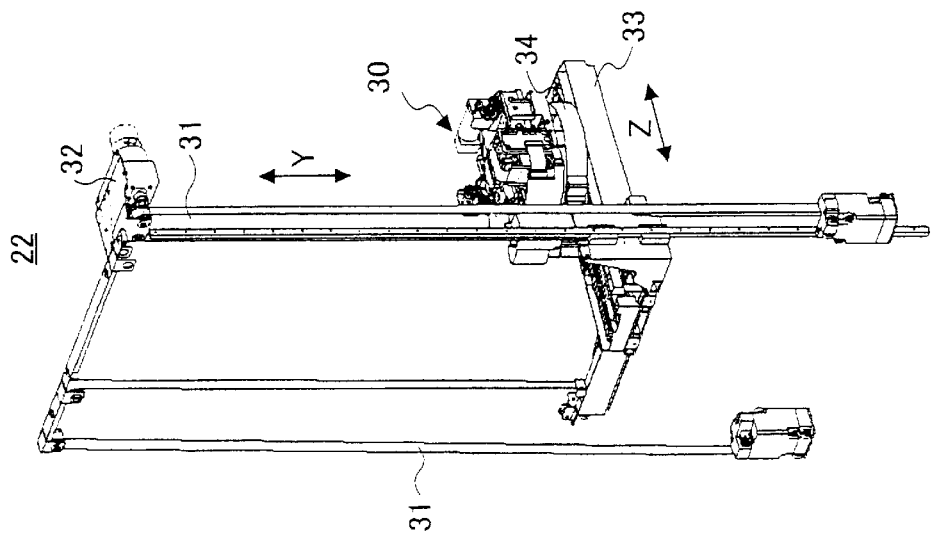

POSITION DETECTING APPARATUS AND LIBRARY APPARATUS

BACKGROUND OF THE INVENTION

1. Field of the Invention

The present invention relates to position detecting apparatuses and library apparatuses and, more particularly, to a position detecting apparatus and a library apparatus that have a flag and a sensor for detecting the flag.

As is generally known, there is a magnetic tape apparatus using a magnetic tape as a recording medium among external storages of a computer. The majority of magnetic tape apparatuses use a magnetic tape cartridge having a tape 0.5 inches in width therein, wherein the tape is automatically fetched from a reel therein to load data. A magnetic tape library apparatus (hereinafter called a library apparatus) accommodates as many magnetic tape cartridges as necessary (entry), which are loaded into a magnetic tape recording-playing apparatus to write and read data.

The library apparatus includes a cabinet having a plurality of cells to accommodate magnetic tape cartridges, a magnetic tape recording-playing apparatus for recording and playing data, and a carrying apparatus for carrying the magnetic tape cartridges between the cabinet and the magnetic tape recording-playing apparatus.

A large-scale library apparatus is formed by connecting mutually a plurality of independent frames each of which accommodates a cabinet, a magnetic tape recording-playing apparatus or the like. Consequently, when such a large-scale library is assembled, there arises an increasing error with respect to alignment of individual parts constituting the large-scale library apparatus, whereby it becomes difficult to position accurately a carrying apparatus for each cell in a cabinet by using only estimated values regarding the architecture of the library apparatus obtained at the designing phase. Thus, in the library apparatus, there is provided a position detecting apparatus for detecting a position of the carrying apparatus relative to the cabinet or the magnetic tape recording-playing apparatus so as to correct misalignment.

2. Description of the Related Art

FIG. 1 shows an example of a conventional position detecting apparatus provided in a library apparatus 1. In FIG. 1, there is positioned a carrying apparatus so as to face a cabinet 3. In the carrying apparatus 2, there are provided a medium holding mechanism 5 and a sensor 7 on a base 6. A magnetic tape cartridge 4 is accommodated in a medium slot 14 provided in the cabinet 3. In addition, a flag 10 is provided at a predetermined position in the cabinet 3. A position detecting apparatus, which is operable to position the carrying apparatus 2 and the cabinet 3, comprises the sensor 7 provided in the carrying apparatus 2 and the flag 10 provided in the cabinet 3.

The carrying apparatus 2 is formed so as to move in any of X, Y and Z directions, represented by arrows in FIG. 1. The medium holding mechanism 5 has holding arms 8 for holding the magnetic tape cartridge 4. Thus, the carrying apparatus 2 can insert/eject the magnetic tape cartridge 4 into/from the cabinet 3.

The magnetic tape cartridge 4 ejected from the cabinet 3 is carried to a magnetic tape recording-playing apparatus not illustrated in FIG. 1 and is mounted thereon to record or play data. Also in the magnetic tape recording-playing apparatus, there is provided a flag 10 similar to that provided in the cabinet 3.

The flag 10 is accurately positioned relative to the medium slot 14 provided in the cabinet 3. As a result, the carrying apparatus 2 detects the flag 10 by using the sensor 7, whereby it becomes possible to position the medium holding mechanism 5 and the magnetic tape cartridge 4 (the medium slot 14).

FIG. 2 shows a structure of the conventional flag 10. As is shown in FIG. 2, the flag 10 comprises a black part 11 and a white part 12. Since the sensor 7 provided in the carrying apparatus 2 is a reflective sensor, the sensor 7 becomes OFF when the sensor 7 faces the black part 11 and ON when the sensor 7 faces the white part 12.

The flag 10 is square-shaped as a whole. The black part 11 is formed as a slightly smaller square than the flag 10. On the other hand, as is shown in FIG. 2, the white part 12 is located in an upper and left area of the black part 11 and is provided so as to form an inverse L-shaped area.

A description will now be given of a conventional process for detecting a relative position of the carrying apparatus 2 to the cabinet 3 by using the flag 10 shown in FIG. 2.

At the beginning, the carrying apparatus 2 is moved and positioned so that the sensor 7 can face a center P0 (hereinafter referred to as a nominal sensor position) of the black part 11 formed in the flag 10. Additionally, in the carrying apparatus 2, there is provided an encoder capable of detecting moving distances in the X, Y and Z directions, thereby detecting the moving distances of the carrying apparatus 2.

However, since there are some shape errors in individual parts constituting the carrying apparatus 2 and the cabinet 3 and there arises some unevenness at the assembling of the parts, a sensor detecting position of the sensor 7 cannot always be adjusted correctly to the nominal position P0 (the center in the black part 11 of the flag 10). Thus, even if the carrying apparatus 2 is moved to a predetermined position for the cabinet 3, there arises, in fact, misalignment between the carrying apparatus 2 and the cabinet 3.

This misalignment is equivalent to misalignment between the holding arms 8 and the magnetic tape cartridge 4. Accordingly, when the holding arms 8 attempt to hold the magnetic tape cartridge 4 while the misalignment remains, the holding arms 8 are in risk of not holding the magnetic tape cartridge 4 properly.

A description will now be given, with reference to FIGS. 3 through 5, of a holding operation of the medium holding mechanism 5 for the magnetic tape cartridge 4. In the description to be mentioned later, two coordinate systems of the magnetic tape cartridge 4 accommodated in the cabinet 3 and of the medium holding mechanism provided in the carrying apparatus 2 are set separately for the convenience of explanation. Then, the coordinate system of the magnetic tape cartridge 4 is represented as an X'–Y' coordinate, and the coordinate system of the medium holding mechanism 5 is represented as an X–Y coordinate.

FIG. 3 shows an ideal situation in which there is no shape error in individual parts constituting the carrying apparatus 2 and the cabinet 3 and there arises no unevenness at the assembling of the parts. In this situation, the X'–Y' coordinate of the magnetic tape cartridge 4 is consistent with the X–Y coordinate of the medium holding mechanism 5. As a result, the holding arms 8 can hold the magnetic tape cartridge 4 properly.

Here, in the magnetic tape cartridge 4, there is provided a receiving part 13 (a concave part similar to a receiving part 41 shown in FIG. 10) to embed the holding arms 8 therein. As a result, when holding the magnetic tape cartridge 4, the holding arms 8 interlock the receiving part 13.

FIGS. 4 and 5 show situations in which there arises misalignment between the carrying apparatus 2 and the cabinet 3. In the misalignment shown in FIG. 4, since the center P0 (the nominal sensor position) of the X'-Y' coordinate of the magnetic tape cartridge 4 coincides with a center P1 (hereinafter, called an actual sensor detecting position P1) of the X-Y coordinate of the medium holding mechanism 5, it is concluded that the misalignment is caused by the fact that one coordinate has rotated relatively to the other on the centers P0 and P1.

Regarding misalignment in a rotational direction as shown in FIG. 4, if the misalignment mainly results from slight defects such as the shape errors on individual parts constituting the carrying apparatus 2 and the cabinet 3 and the unevenness at the assembling of the parts, the relative position of the holding arms 8 to the receiving part 13 remains comparatively accurate. Consequently, even if the misalignment in the rotational direction occurs, the holding arms 8 can still hold the magnetic tape cartridge 4 properly.

On the other hand, in the misalignment shown in FIG. 5, the nominal sensor position P0 representing the center of the X'-Y' coordinate for the magnetic tape cartridge 4 does not coincide with the actual sensor detecting position P1 of the sensor 7 representing the center of the X-Y coordinate for the medium holding mechanism 5. In this situation, even if the misalignment in the rotational direction has the same extent as the misalignment shown in FIG. 4, there is a possibility that the holding arms 8 cannot interlock the receiving part 13 properly. Thus, it is likely that the magnetic tape cartridge 4 cannot be inserted and ejected for the cabinet 3 appropriately.

Accordingly, in the case in which the nominal sensor position P0 representing the center of the X'-Y' coordinate for the magnetic tape cartridge 4 does not coincide with the actual sensor detecting position P1 of the sensor 7 representing the center of the X-Y coordinate for the medium holding mechanism 5, it is necessary to detect a quantity of misalignment between the nominal sensor position P0 and the actual sensor detecting position P1 of the sensor 7 and use the quantity to correctly position the holding arms 8 and the magnetic tape cartridge 4 correctly. Thus, in the library apparatus, there is provided a position detecting apparatus having the sensor 7 and the flag 10.

A description will now be given of a conventional method of how the position detecting apparatus actually detects a quantity of misalignment between the nominal sensor position P0 and the actual sensor detecting position P1 where the sensor 7 is actually located. Here, the amount of misalignment in the X and the Y directions between the nominal sensor position P0 and the actual sensor detecting position P1 are represented by a $\Delta X$ and a $\Delta Y$, respectively.

In the case in which the nominal sensor position P0 does not coincide with the actual sensor detecting position P1, as is shown in FIG. 2, the carrying apparatus 2 is moved in the Y direction until the sensor 7 becomes ON. At this time, an encoder measures a moving distance A of the medium holding mechanism 5.

After the above process is completed, the medium holding mechanism 5, in turn, is moved in the X direction until the sensor 7 becomes ON. At this time, the encoder measures a moving distance B of the medium holding mechanism 5.

The quantity of misalignment ($\Delta X$, $\Delta Y$) between the nominal sensor position P0 and the actual sensor detecting position P1 is computed by subtracting quantities a in the Y direction and b in the X direction between the nominal sensor position P0 and the white part 12 from the distances A and B as measured in the above manner, respectively. The quantities $\Delta X$ and $\Delta Y$ are used as correction values to correctly position the cabinet 3. In the above manner, even if there are some shape errors on individual parts constituting the carrying apparatus 2 and the cabinet 3 and there arises unevenness at the assembling of the parts, the carrying apparatus 2 (the medium holding mechanism 5) can insert/eject the magnetic tape cartridge 4 into/from the cabinet 3 and the magnetic tape recording-playing apparatus with high accuracy.

However, under the conventional position detecting apparatus, it is necessary to move the carrying apparatus 2 (the medium holding mechanism 5) in the Y direction and thereafter in the X direction to detect the misalignment quantities ($\Delta X$, $\Delta Y$) between the nominal sensor position P0 and the actual sensor detecting position P1. Consequently, there is a problem in that it takes a long time to detect the misalignment quantities ($\Delta X$, $\Delta Y$) due to the conventional detecting process requiring the carrying apparatus 2 be moved in the two directions.

The flag 10 is provided not only in the cabinet 3 but also in the magnetic tape recording-playing apparatus. In addition, in a case in which the flag 10 is provided in the cabinet 3 and the magnetic tape recording-playing apparatus, the flag 10 is conventionally provided at a plurality of positions in the cabinet 3 and the magnetic tape recording-playing apparatus rather than at only one position so as to enhance the accuracy of position detection.

Therefore, especially in a large-scale library apparatus having a large number of flags 10 therein, there arises a problem in that the resulting increasing number of operations influences the operating life of the carrying apparatus 2.

SUMMARY OF THE INVENTION

It is a general object of the present invention to provide an improved and useful position detecting apparatus and an improved and useful library apparatus in which the above-mentioned problems are eliminated.

A more specific object of the present invention is to provide a position detecting apparatus and a library apparatus that can spend less time performing a position detecting process.

In order to achieve the above-mentioned objects, there is provided according to one aspect of the present invention a position detecting apparatus for detecting a relative position of a measuring member to a measured member, comprising: a flag provided in the measured member, the flag including a first area having first optical characteristics and a second area having second optical characteristics different from the first optical characteristics; a sensor detecting optically the first area and the second area of the flag and further detecting a relative position, wherein the first area is formed as a pair of triangles or trapezoids that are positioned symmetrically with respect to an axis of the flag, and the sensor is adapted to detect the flag linearly, and wherein the position detecting apparatus is adapted to detect the relative position of the measuring member to the measured member based on a coordinate of a boundary position between the first area and the second area in a linear track detected by the sensor.

According to the above-mentioned invention, the sensor detects linearly the first area formed as a pair of triangles or trapezoids being positioned symmetrically with respect to an axis. Based on this detection result, the sensor detects a relative position of the measuring member to the measured member. At such time, the sensor uses some geometrical characteristics regarding the pair of triangles and trapezoids and the alignment with the axis to perform the position detecting process efficiently.

In fact, the sensor can detect easily the relative position of the measuring member to the measured member by using a coordinate of an intersection of a detecting line by the sensor and the first area. Also, the sensor can detect successfully the relative position even if the sensor performs the position detecting process only in one direction by using the geometrical characteristics, thereby shortening the time required to perform the position detecting process.

Also, the sensor finds a coordinate of a boundary between the first and the second areas, thereby performing a computation for the position detecting process. By using the geometrical characteristics, the position detecting process can be performed through a simple and time-saving computation.

In the above-mentioned position detecting apparatus, the sensor may be formed of a line type solid-state image sensing device.

According to the above-mentioned invention, when the line type solid-state image sensing device is used as the sensor, it is possible to detect a length of the sensor collectively, thereby spending less time performing the position detecting process than a scanning type sensor.

Additionally, there is provided according to another aspect of the present invention a library apparatus comprising: a medium storage cabinet storing a medium; a recording-playing unit performing a recording-playing process on the medium; a carrying mechanism carrying the medium between the medium storage cabinet and the recording-playing unit; and a position detecting apparatus for detecting a relative position of a measuring member to a measured member, comprising: a flag provided in the measured member, the flag including a first area having first optical characteristics and a second area having second optical characteristics different from the first optical characteristics; a sensor detecting optically the first area and the second area of the flag and further detecting a relative position, wherein the first area is formed as a pair of triangles or trapezoids that are positioned symmetrically with respect to an axis of the flag, and the sensor is adapted to detect the flag linearly, and wherein the position detecting apparatus is adapted to detect the relative position of the measuring member to the measured member based on a coordinate of a boundary position between the first area and the second area in a linear track detected by the sensor, wherein the flag is provided either in the medium storage cabinet or the recording-playing unit, and the sensor is provided in the carrying mechanism.

According to the above-mentioned invention, if the flag constituting the position detecting apparatus is provided either in the medium storage cabinet or the recording-playing unit and the sensor is provided in the.carrying mechanism, it becomes possible to insert and eject the medium for the medium storage cabinet with high accuracy when the carrying mechanism carries, inserts and ejects the medium for the medium storage cabinet.

In the above-mentioned library apparatus, the sensor may be provided in a neighborhood of a medium holding mechanism for holding the medium carried by the carrying mechanism.

According to the above-mentioned invention, since there is provided a sensor in a neighborhood of a medium holding mechanism for holding the medium carried by the carrying mechanism, it becomes possible to enhance accuracy of the position detection.

Additionally, there is provided according to another aspect of the present invention a library apparatus comprising: a plurality of medium storage parts in which a medium is stored, inserted and ejected; a carrying mechanism carrying the medium among the medium storage parts; a mark part providing a mark at a fixed position of the medium storage parts for detecting alignment of the medium storage parts; a sensor provided in the carrying mechanism and detecting the mark by scanning linearly; and a control part detecting an amount of misalignment from a normal position of the mark and controlling a carrying position of the carrying mechanism, wherein the mark detected by the sensor is defined by two boundaries, the boundaries being positioned symmetrically with respect to an axis of the mark part in a direction orthogonal with respect to a scanning direction of the sensor so that distances regarding the two boundaries vary continuously so as to detect the distances at a position different from an orthogonal direction with the scanning direction of the sensor, and wherein the control part detects the amount of misalignment from the normal position of the mark and controls the carrying position of the carrying mechanism based on the distances regarding the two boundaries.

Other objects, features and advantages of the present invention will become more apparent from the following detailed description when read in conjunction with the accompanying drawings.

BRIEF DESCRIPTION OF THE DRAWINGS

FIG. 6A is a front perspective view illustrating an outer appearance of a library apparatus according to an embodiment of the present invention;

FIG. 6B is a rear perspective view illustrating the outer appearance of the library apparatus according to the embodiment of the present invention;

FIG. 8A is a full perspective view illustrating a carrying apparatus provided in the library apparatus according to the embodiment of the present invention;

FIG. 8B is an enlarged view illustrating a medium holding mechanism provided in the library apparatus according to the embodiment of the present invention;

DETAILED DESCRIPTION OF THE PREFERRED EMBODIMENTS

Figure 1:
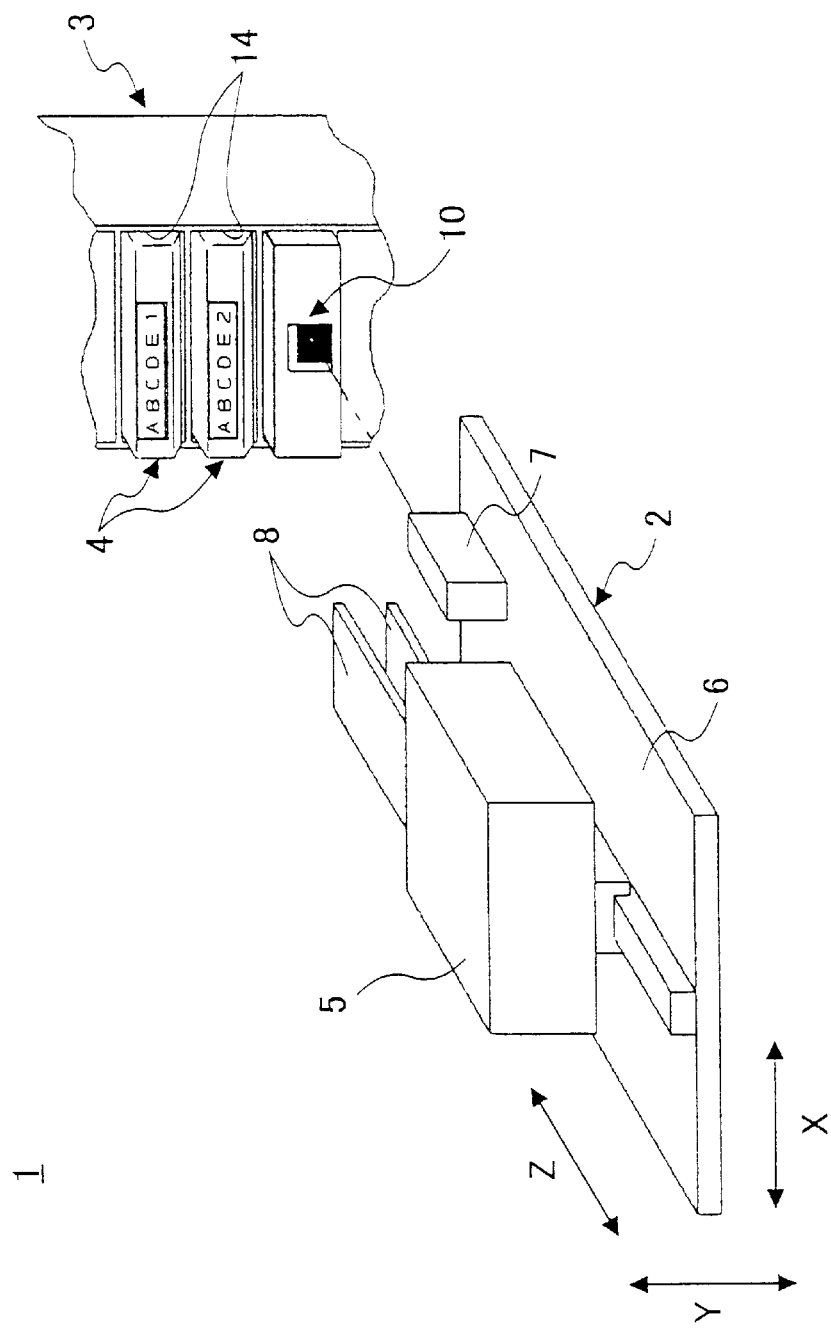
FIG. 1 is a diagram roughly illustrating a structure of a conventional library apparatus.
Figure 2:
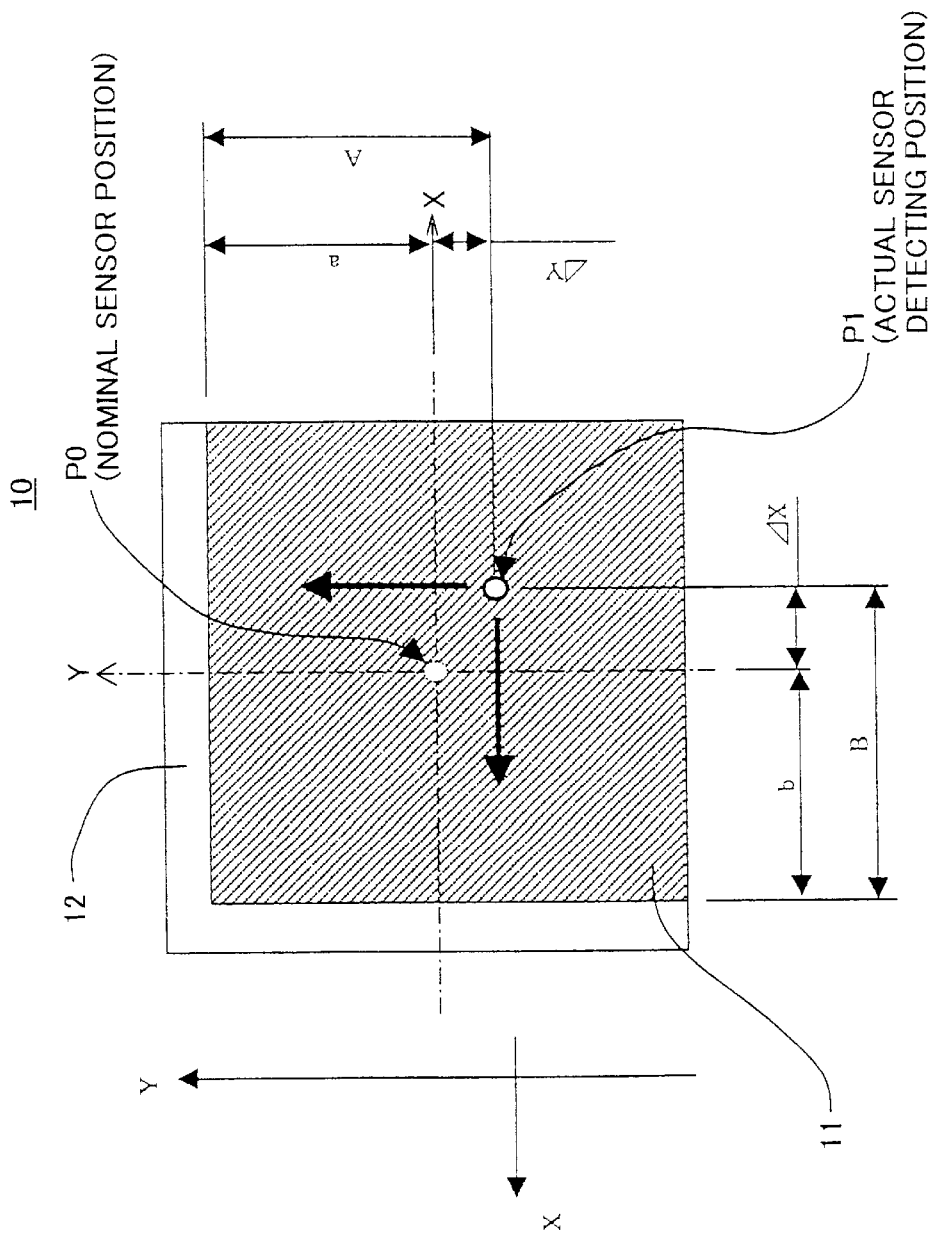
FIG. 2 is a diagram explaining a structure of a conventional flag and a position detecting method using the flag.
Figure 3:
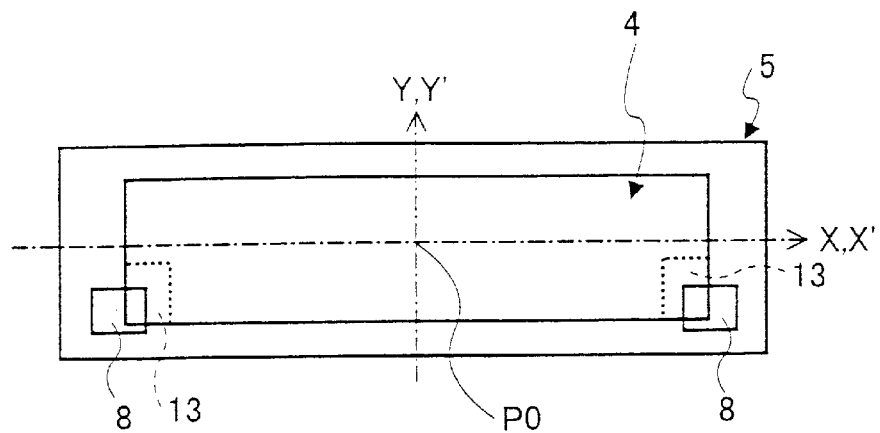
FIG. 3 is a diagram illustrating a relative position of a medium holding mechanism to a magnetic tape cartridge in a normal condition.
Figure 4:
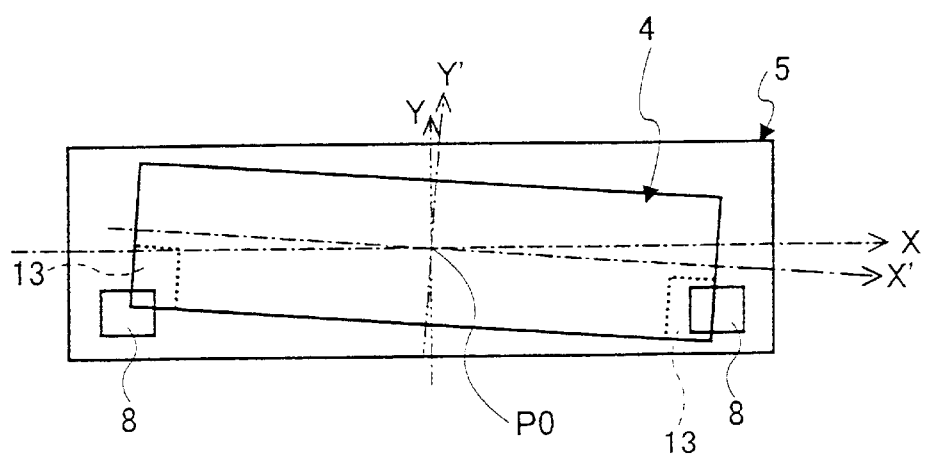
FIG. 4 is a diagram illustrating a situation in which a center of the magnetic tape cartridge coincides with a center of the medium holding mechanism and the magnetic tape cartridge is misaligned in a rotational direction.

In the following, embodiments of the present invention will be described with reference to the accompanying drawings.

FIGS. 6A, 6B, 7A and 7B show a position detecting apparatus and a library apparatus 20. FIG. 6A shows a front of the library apparatus 20, and FIG. 6B shows a rear of the library apparatus 20. The following description explains an example in which a magnetic tape cartridge 40 is used as a medium accommodated in the library apparatus 20.

As shown in FIGS. 6A and 6B, in the library apparatus 20, there are provided an injecting-ejecting mechanism 26 (CAS) to inject and eject the magnetic tape cartridge 40, on a front door 28 in front of a housing 25 and an operator panel 27 in which various switches are provided for an operator. The magnetic tape cartridge 40 is injected and ejected by the injecting-ejecting mechanism 26.

Figure 7A:
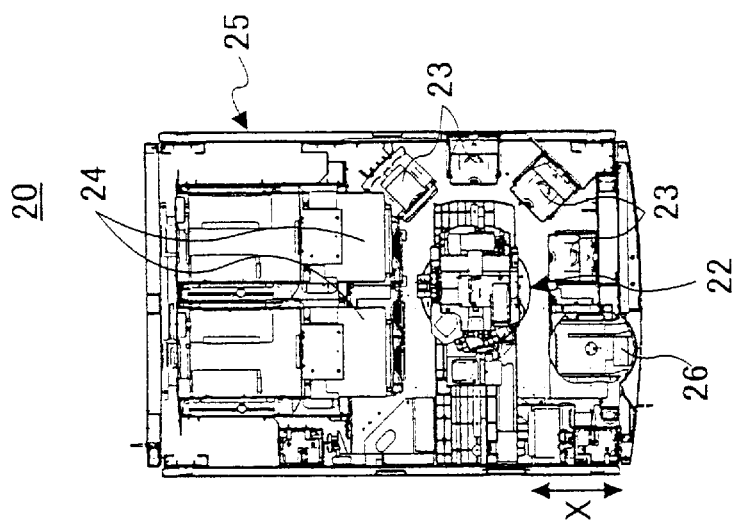
FIG. 7A is a perspective view illustrating an internal structure of the library apparatus according to the embodiment of the present invention.
Figure 7B:
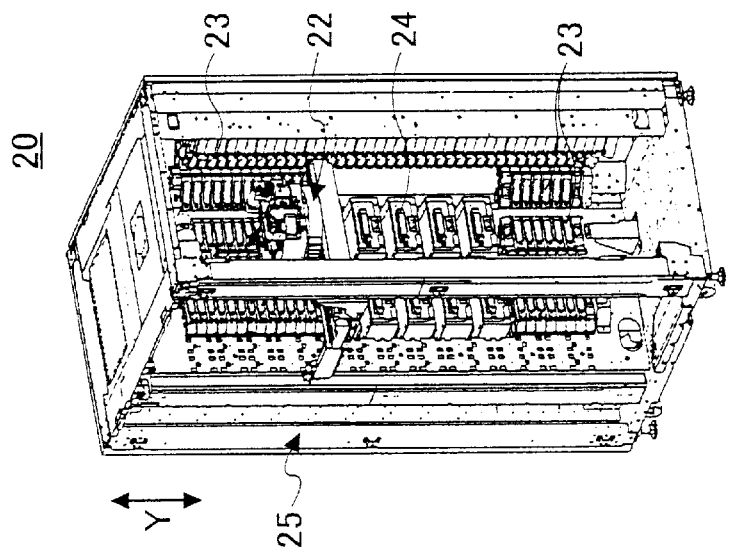
FIG. 7B is a sectional view illustrating the internal structure of the library apparatus according to the embodiment of the present invention.

FIGS. 7A and 7B show an internal structure of the library apparatus 20. FIG. 7A shows the library apparatus 20 in which the front door 28 and a side board 25a of the housing 25 are removed from the library apparatus 20 shown in FIG. 6A, and FIG. 7B shows the library apparatus 20 in which a top board 25b of the housing 25 is further removed from the library apparatus 20 shown in FIG. 7A.

The library apparatus 20 mainly comprises a carrying apparatus 22, a cabinet 23 and a magnetic tape recording-playing apparatus 24 in the housing 25.

As shown in FIG. 8A, the carrying apparatus 22 comprises a medium holding mechanism 30, Y-directional carriage rails 31, a Y-directional driving unit 32, a base 33, and a driving unit 35. The medium holding mechanism 30 is mounted on the base 33. In addition, a horizontal rotating mechanism 34 is provided between the medium holding mechanism 30 and the base 33. The horizontal rotating mechanism 34 makes it possible for the medium holding mechanism 30 to rotate on the base 33 in directions shown by the arrow D in FIG. 8B.

The base 33 can move along a pair of Y-directional carriage rails 31 in directions shown by an arrow Y in FIG. 8A. The Y-directional driving unit 32 is provided on the Y-directional carriage rails 31. The Y-directional driving unit 32 generates a driving force which moves the base 33 along the Y-directional carriage rails 31 in the directions shown by the arrow Y.

The driving unit 35 is provided in the medium holding mechanism 30. The driving unit 35 generates a driving force which moves the medium holding mechanism 30 along the base 33 in the directions shown by the arrow Z in FIG. 8B.

Figure 9:
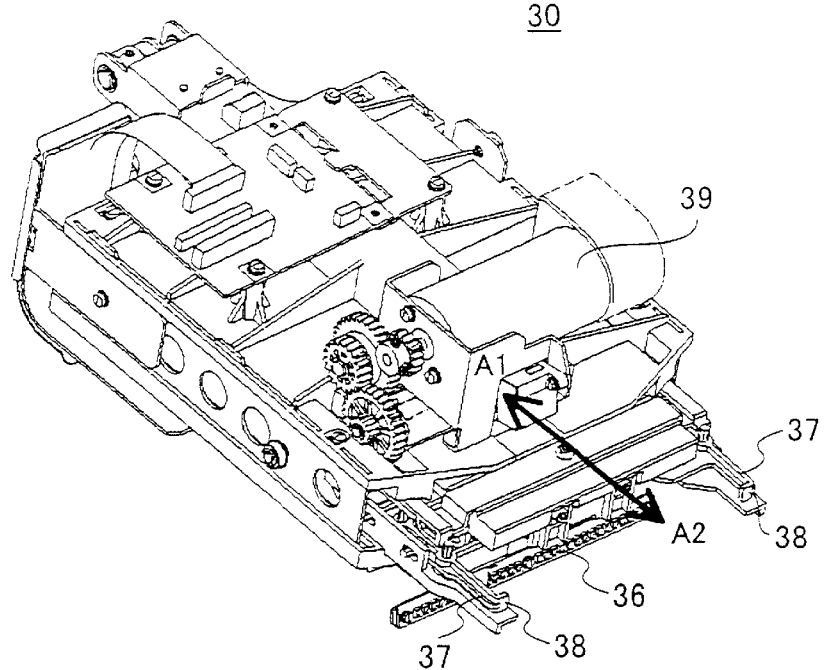
FIG. 9 is a perspective view illustrating the medium holding mechanism constituting the carrying apparatus.

FIG. 9 shows the medium holding mechanism 30 in detail. As shown in FIG. 9, the medium holding mechanism 30 has a pair of holding arms 37 movable in directions shown by arrows A1 and A2 in FIG. 9 by an arm driving motor 39. The holding arms 37 serve to hold the magnetic tape cartridge 40. The magnetic tape cartridge 40 may be injected into and ejected from the cabinet 23 or the magnetic tape recording-playing apparatus 24 in a state that the holding arms 37 are holding the magnetic tape cartridge 40.

Figure 10:
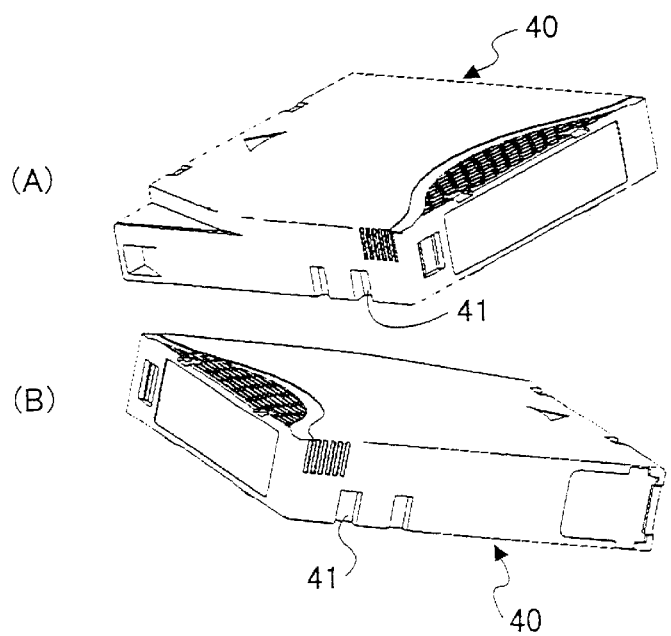
FIG. 10 is a perspective view illustrating a structure of a magnetic tape cartridge.

A hook-shaped claw part 38 is formed at the edge of each holding arm 37. The claw part 38 is formed so as to interlock a receiving part 41 provided in the magnetic tape cartridge 40 when the holding arms 37 hold the magnetic tape cartridge 40 (ref. FIG. 10).

Figure 11:
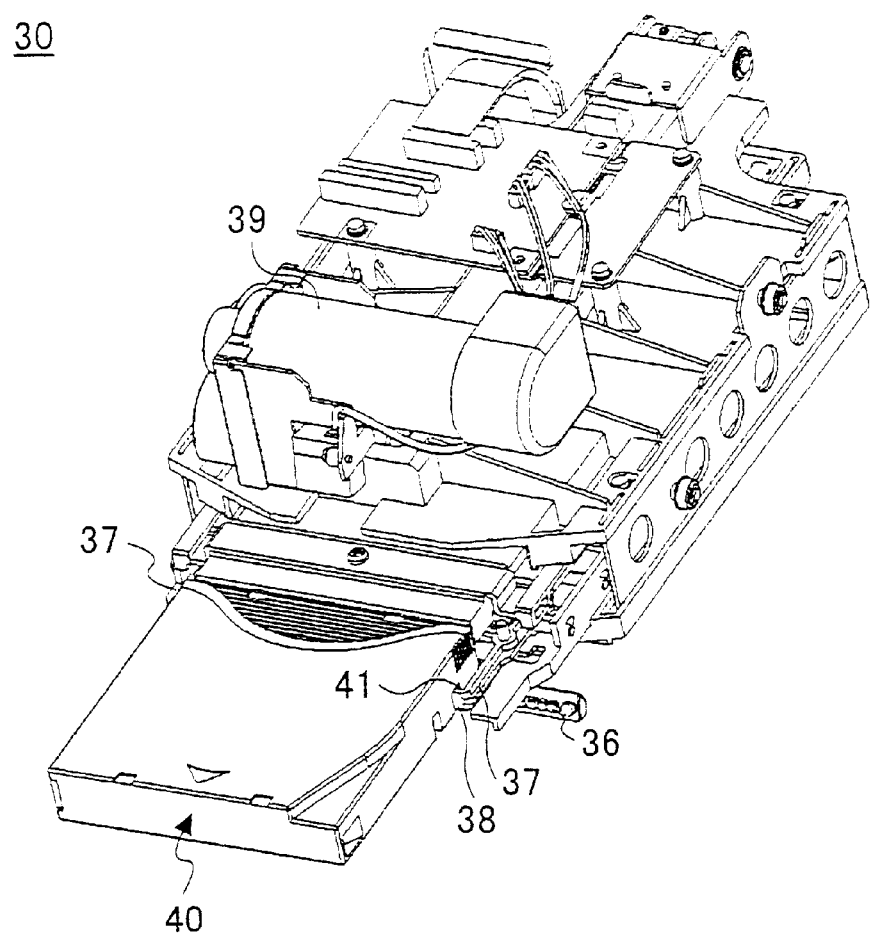
FIG. 11 is a perspective view illustrating a condition in which the medium holding mechanism constituting the carrying apparatus holds the magnetic tape cartridge.

As a result, when the holding arms 37 hold the magnetic tape cartridge 40, the magnetic tape cartridge 40 is firmly held in the medium holding mechanism 30 because the claw part 38 interlocks the receiving part 41. FIG. 11 shows a state that the medium holding mechanism 30 holds the magnetic tape cartridge 40 by the interlocking of the holding arms 37 and the magnetic tape cartridge 40.

Additionally, a CCD sensor 36 is provided in the medium holding mechanism 30. This CCD sensor 36 corresponds to a sensor mentioned in the claims. In this embodiment of the present invention, the CCD sensor 36 is formed of a line type CCD camera. The line type CCD sensor 36 can collectively read data corresponding to a length of a line thereof. Thus, the line type CCD sensor 36 can shorten the detecting time, because the conventional point type reflective sensor 7 requires a scanning operation whereas the line type CCD sensor 36 does not require such a scanning operation.

The CCD sensor 36 is mounted in the medium holding mechanism 30 and serves as a measuring member, which will be mentioned later. Thus, the CCD sensor 36 is adjacent to the holding arms 37 actually working to hold the magnetic tape cartridge 40 and there is a decreasing error between the CCD sensor 36 and the holding arms 37, thereby improving the accuracy of the position detecting process by means of the CCD sensor 36.

Although this embodiment of the present invention uses the line type CCD sensor as the CCD sensor 36, a conventional point type reflective sensor 7 may be used as the CCD sensor 36 in this embodiment of the present invention. Also, other line type sensors may be used.

Figure 12:
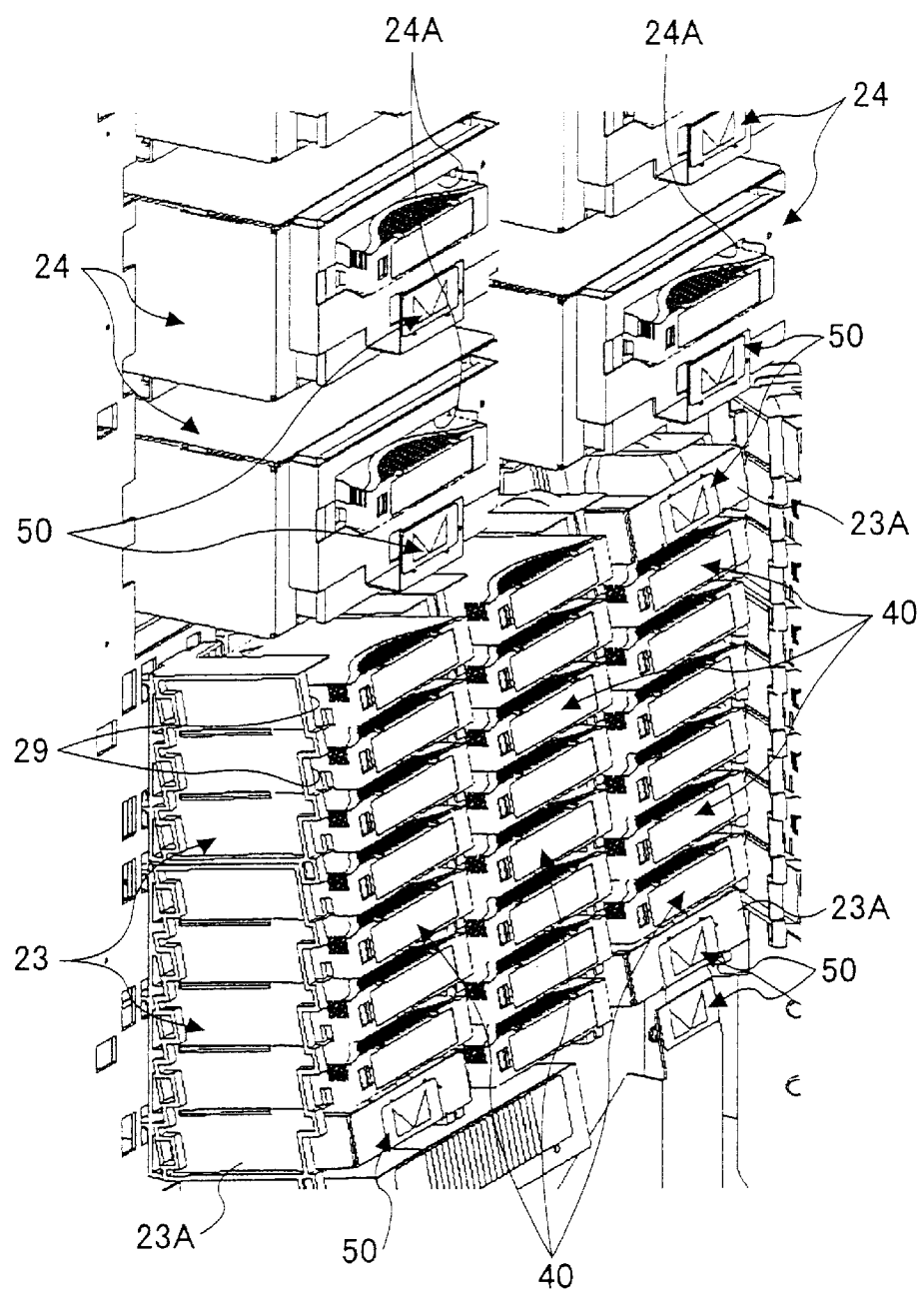
FIG. 12 is an enlarged perspective view illustrating a cabinet and a magnetic tape recording-playing apparatus provided in the library apparatus according to the embodiment of the present invention.

A plurality of the cabinets 23 (the medium storage part) are provided in the housing 25 as shown in FIG. 12. In each of the cabinets 23, a medium inserting part 29 is provided into which a magnetic tape cartridge 40 may be inserted. Each of the cabinets 23 is obliquely formed so as to enhance the capacity to accommodate the magnetic tape cartridge 40. In addition, as is shown in FIG. 12, a predetermined cabinet (represented as a 23A) is formed so as to prevent the magnetic tape cartridge 40 from entering therein, and a flag 50 (a mark) is provided in this predetermined cabinet 23A.

A plurality of magnetic tape recording-playing apparatuses 24 are also provided in the housing 25. In each magnetic tape recording-playing apparatus 24, a medium inserting part 24A is provided into which the magnetic tape cartridge 40 may be inserted. In each of the magnetic tape recording-playing apparatuses 24, a flag 50 is provided at a lower position of the medium inserting part 24A. It is noted that the flag 50 provided in the predetermined cabinet 23A has a similar form to the flag 50 provided in the magnetic tape recording-playing apparatus 24.

As mentioned above, the magnetic tape cartridge 40 is inserted into and ejected from the cabinet 23 or the magnetic tape recording-playing apparatus 24 by using the medium holding mechanism 30. At such time, in order to properly insert the magnetic tape cartridge 40 into the cabinet 23 or the magnetic tape recording-playing apparatus 24, it is necessary to position the medium holding mechanism 30 relative to the cabinet 23 and the magnetic tape recording-playing apparatus 24 with high accuracy.

For this reason, in the library apparatus 20, a position detecting apparatus is provided for positioning the medium holding mechanism 30 (which corresponds to a measuring member in the claims) relative to the cabinet 23 and the magnetic tape recording-playing apparatus 24 (which corresponds to a measured member in the claims) with high accuracy. This position detecting apparatus comprises the CCD sensor 36 and the flag 50.

A description will now be given of a structure of the flag 50, the CCD sensor 36, and a position detecting process by means of the flag 50. Initially, the structure of the flag 50 will be described with reference to FIG. 13.

Figure 13:
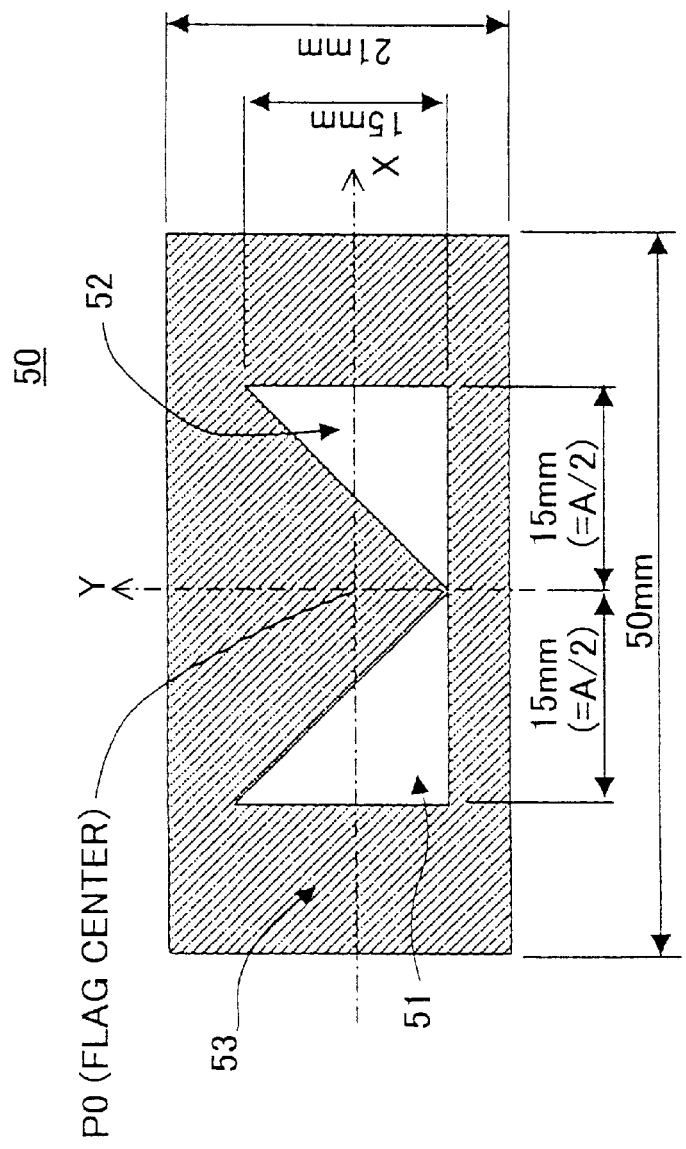
FIG. 13 is a diagram illustrating a flag constituting a position detecting apparatus according to the embodiment of the present invention.

FIG. 13 shows the flag 50 provided in the cabinet 23A and the magnetic tape recording-playing apparatus 24 in detail. As is shown in FIG. 13, the flag 50, for example, is formed of a rectangular plate-shaped base having a length of 21 mm and a width of 50 mm, and comprises a first white part 51, a second white part 52 and a black part 53 thereon.

The first white part 51 and the second white part 52 correspond to a first area in the claims, and are colored with a white paint or a silver paint both of which have high reflection of light in this embodiment of the present invention. The area other than the first white part 51 and the second white part 52 is colored with a black paint that has high absorption of light. Thus, the first white part 51, the second white part 52 and the black part 53 are formed so as to differ in light reflectivity (optical characteristics).

The first white part 51 and the second white part 52 are configured as right isosceles triangles. Assume an X–Y coordinate whose origin coincides with a center of the flag 50 (hereinafter referred to as a flag center P0). The first white part 51 and the second white part 52 are formed so as to be symmetrical with respect to the Y axis of the X–Y coordinate. FIG. 13 shows an example regarding sizes of the first white part 51 and the second white part 52.

A description will now be given of a position detecting process with respect to a position of the medium holding mechanism 30 relative to the cabinet 23 or the magnetic tape recording-playing apparatus 24 by using a position detecting apparatus comprising the CCD sensor 36 and the flag 50.

Figure 5:
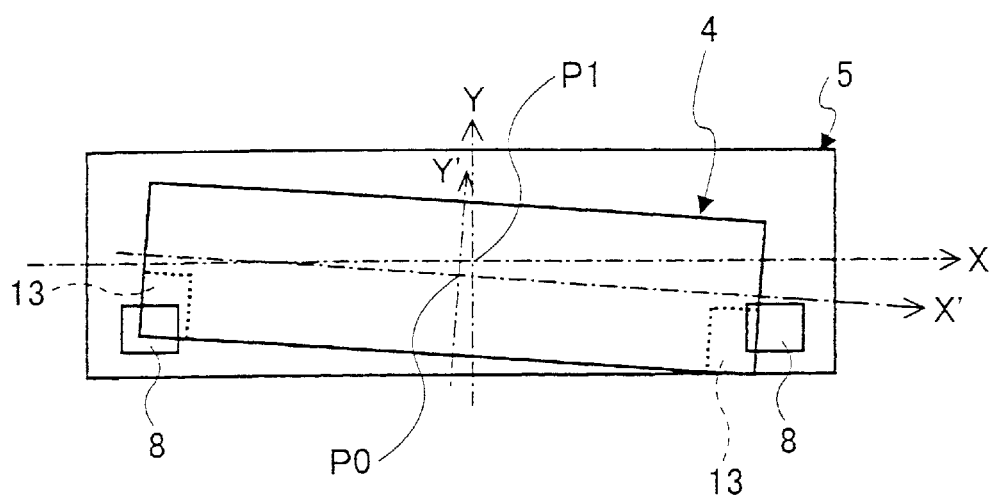
FIG. 5 is a diagram illustrating a situation in which a center of the magnetic tape cartridge does not coincide with a center of the medium holding mechanism and the magnetic tape cartridge is misaligned in a rotational direction.

As mentioned with respect to FIG. 5, in a case in which the flag center P0 and the sensor detecting position P1 are misaligned, it is necessary to compute the amounts of misalignment ΔX and ΔY by performing the position detecting process and to use the amounts as correction values to accurately position the cabinet 23 or the magnetic tape recording-playing apparatus 24. Thus, the following description will be concentrated on the case in which the flag center P0 and the sensor detecting position P1 are misaligned. (It is noted that the flag center P0 and the sensor detecting position P1 are positioned differently from an orthogonal direction with respect to a scanning direction of a sensor in the claims.)

Figure 14:
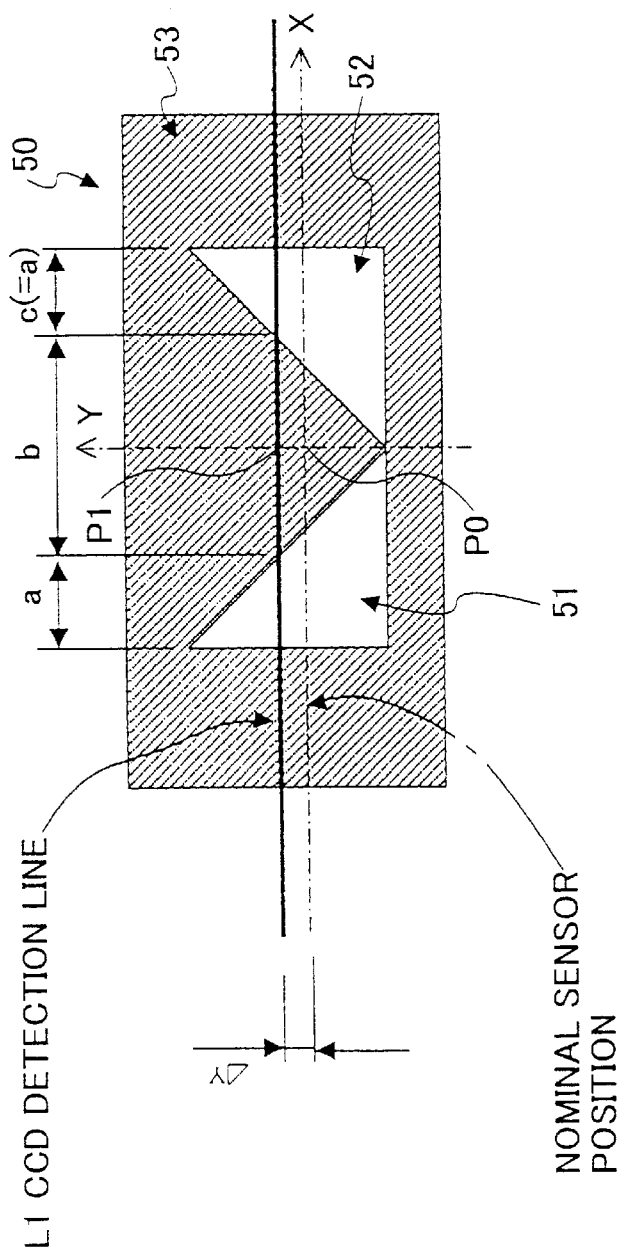
FIG. 14 is a diagram illustrating a position detecting process in a case that the medium holding mechanism is misaligned to the flag only in the Y direction.

FIG. 14 shows a case that a detecting position by the CCD sensor 36 (hereinafter referred to as a CCD detecting line L1) is misaligned only in the Y direction. In the example shown in FIG. 14, the CCD detecting line L1 is misaligned with respect to the flag center P0 in an upper direction by the amount ΔY. Since the CCD detecting line L1 is misaligned only in the Y direction, the CCD detecting line L1 and the X axis are parallel each other.

In an ideal case in which there is no shape error of individual parts constituting the carrying apparatus 22 (the medium holding mechanism 30), the cabinet 23 and the magnetic tape recording-playing apparatus 24 and there arises no unevenness at the assembling of the parts, the CCD detecting line L1 would coincide with the X axis of the X–Y coordinate, (such position being referred to as a sensor nominal position). As mentioned above, it is obvious that a position of the CCD detecting line L1 is equivalent to a position of the medium holding mechanism 30, because the CCD sensor 36 is provided in the medium holding mechanism 30.

Suppose that the CCD sensor 36 detects the flag 50 at a position as shown in FIG. 14. Since the flag 50 is formed by the first white part 51 and the second white part 52 having high reflection of light and the black part 53 having low reflection of light, the CCD sensor 36 generates an ON or an OFF signal corresponding to the first and the second white parts 51 and 52 (ON) or the black part 53 (OFF) per a detection unit (a dot), respectively.

If the CCD sensor 36 generates the ON/OFF signal per the dot as mentioned above, it is possible to find a boundary point between the first white part 51 and the black part 53 and a boundary point between the second white part 52 and the black part 53, thereby computing distances a, b and c as shown in FIG. 14 from the numbers of dots at these boundary points, where the distance c is equal to the distance a.

As mentioned above, the first white part 51 and the second white part 52 are formed as right isosceles triangles and are positioned symmetrically with respect to the Y axis. In other words, the first white part 51 and the second white part 52 are formed so that the distances a, b and c can vary continuously in a direction orthogonal with respect to the sensor scan direction X. Furthermore, the first white part 51 and the second white part 52 are positioned symmetrically with respect to the orthogonal direction of the sensor scan direction X and are formed so that the CCD sensor 36 can detect the two boundary points. As a result, it is possible to compute the amount ΔY of misalignment in a geometrical manner based on the distances a and b as shown in FIG. 14. Regarding the X direction, the X distance from the Y-axis of the flag center P0, which is considered to be a center in the X direction, to the boundary points may be computed by the following equation;

$$X = b/2 \tag{1}$$

Also, the length of each base of the first white part 51 and the second white part 52, which are right isosceles triangles, is computed by a formula $(a+b+c)/2$. Here, by using the equation $a=c$, the base length is computed as $(2 \times a + b)/2$. In addition, since the first white part 51 and the second white part 52 are shaped as right isosceles triangles, it can be concluded that the bases and the heights of the first white part 51 and the second white part 52 have the same lengths. Therefore, the amount $\Delta Y$ of misalignment can be computed by the following formula (2);

$$\Delta Y = (a+b+c)/4 - a \qquad (2).$$

FIG. 14 shows the example in which the CCD detection line L1 is misaligned only in the Y direction. However, in practice, misalignment rarely occurs only in the Y direction or only the X direction. In addition to the Y direction or the X direction, typically the practical misalignment also includes misalignment in the rotational direction.

Figure 15:
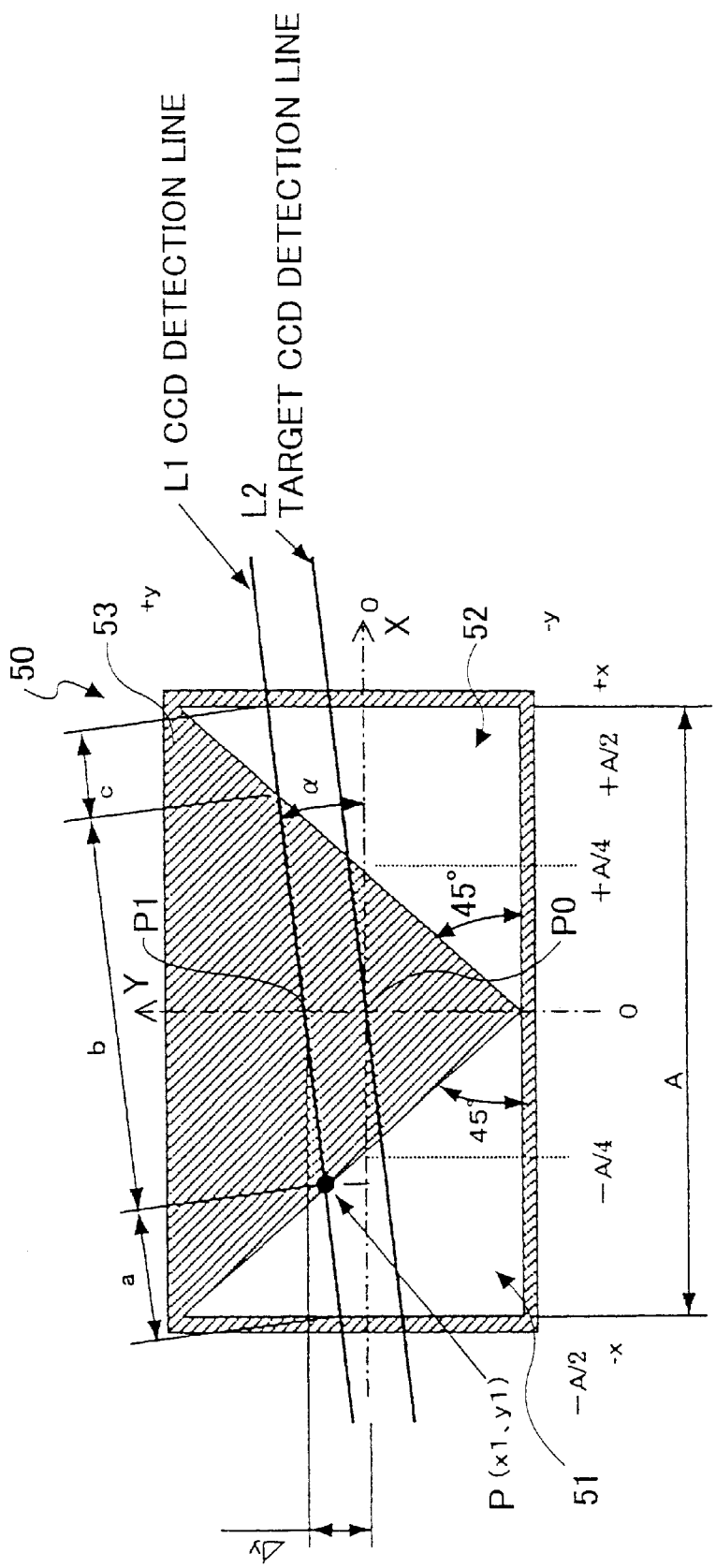
FIG. 15 is a diagram explaining a position detecting process in a case that the medium holding mechanism is misaligned in a rotational direction as well as the Y direction.

FIG. 15 shows an example in which the CCD detection line L1 includes misalignment of the rotational direction. In this example, the CCD detection line L1 rotates by an angle $\alpha$ with respect to the X axis. FIG. 15 shows a target CCD detection line, which is a CCD detection line passing through the flag center P0 line, as a line L2.

Since the CCD detection line L1 is a line, it is possible to represent the CCD detection line L1 as a linear equation in the X–Y coordinate formed in the flag 50. The equation is as follows;

$$Y = \tan\alpha \cdot X + \alpha Y \qquad (3)$$

where $\Delta Y$ is a Y coordinate at an intersection of the CCD detection line L1 and the Y axis. Furthermore, the target CCD detection line L2 can be represented as an equation $Y = \tan\alpha \cdot X$ because the flag center P0 is on the target CCD detection line L2.

A coordinate of a point P (X1, Y1) that is an intersection of the CCD detection line L1 and a side of the first white part 51 may be computed. Similarly with respect to FIG. 14, the CCD sensor 36 generates the ON or OFF corresponding to the first white part 51, the second white part 52, or the black part 53 per the detection unit (the dot). Then, since it is possible to find the boundary point between the first white part 51 and the black part 53 and the boundary point between the second white part 52 and the black part 53, the distances a, b and c shown in FIG. 15 may be computed based on the numbers of dots in these boundary points.

At such time, if the CCD detection line L1 includes the misalignment in the rotational direction, the distance c does not become equal to the distance a. In such situation, if the distance a is more than the distance c, the CCD detection line L1 has an upper-right slope. On the other hand, if the distance a is less than the distance c, the CCD detection line L1 has a lower-right slope. The following description will now concentrate on the former case in which the distance a is more than the distance c.

Figure 16:
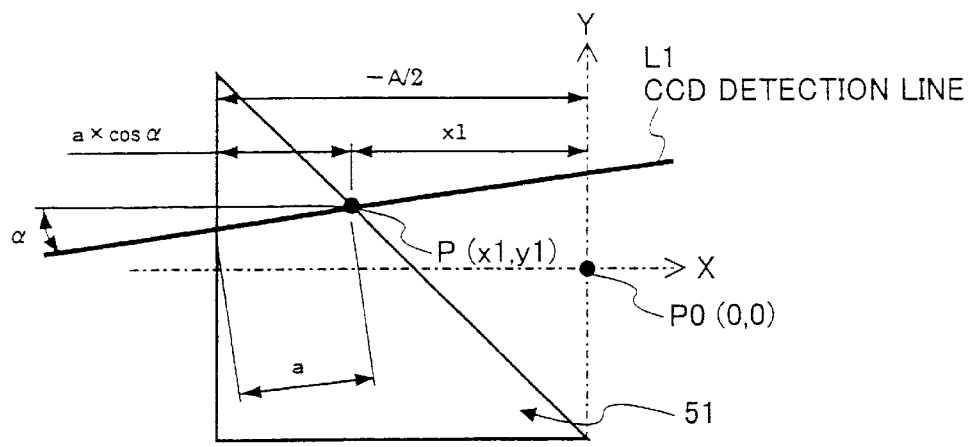
FIG. 16 is a diagram explaining a position detecting process with respect to an amount of misalignment in an X direction in the case shown in FIG. 15.
Figure 17:
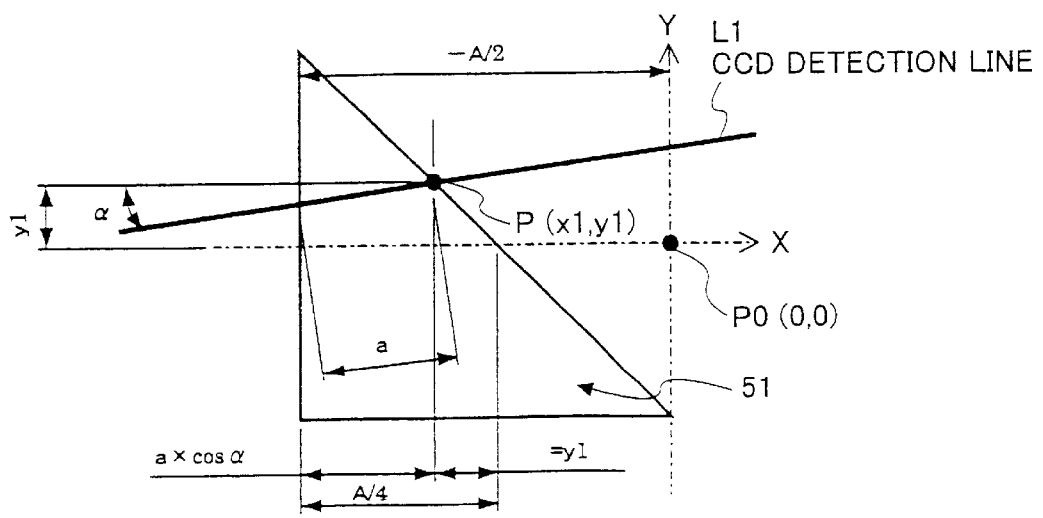
FIG. 17 is a diagram explaining a position detecting process with respect to an amount of misalignment in a Y direction in the case shown in FIG. 15.

FIGS. 16 and 17 show a neighborhood of the point P in detail. FIG. 16 shows how to compute the X coordinate of the point P. FIG. 17 shows how to compute the Y coordinate of the point P. According to FIG. 16, it is possible to compute the X coordinate X1 of the point P by using the following formula (4);

$$X1 = -A/2 + a \cdot \cos\alpha \qquad (4).$$

Similarly, according to FIG. 17, it is possible to compute the Y coordinate Y1 of the point P by using the following formula (5);

$$Y1 = A/4 - a \cdot \cos\alpha \qquad (5),$$

where $\cos\alpha = (a+b+c)/A$.

The above-mentioned equation (3) can be transformed as follows;

$$\Delta Y = Y - \tan\alpha \cdot X \qquad (6),$$

where the amount $\Delta Y$ represents an amount of misalignment in the Y direction between the flag center P0 and the CCD detection line L1.

Substituting the above equations (4) and (5) for the equation (6), it is possible to compute the amount $\Delta Y$ of the misalignment by the following equation;

$$\Delta Y = A/4 - a \cdot \cos\alpha - (-A/2 + a \cdot \cos\alpha) \times \tan\alpha \cdot X \qquad (7).$$

Although the above-mentioned example deals with the case in which the distance a is more than the distance c, it will be appreciated that if the CCD detection line L1 has a lower-right slope, that is, if the distance a is less than the distance c, it is possible to compute the amount $\Delta Y$ of the misalignment by substituting the value a for the value c in the equation (7).

Figure 18:
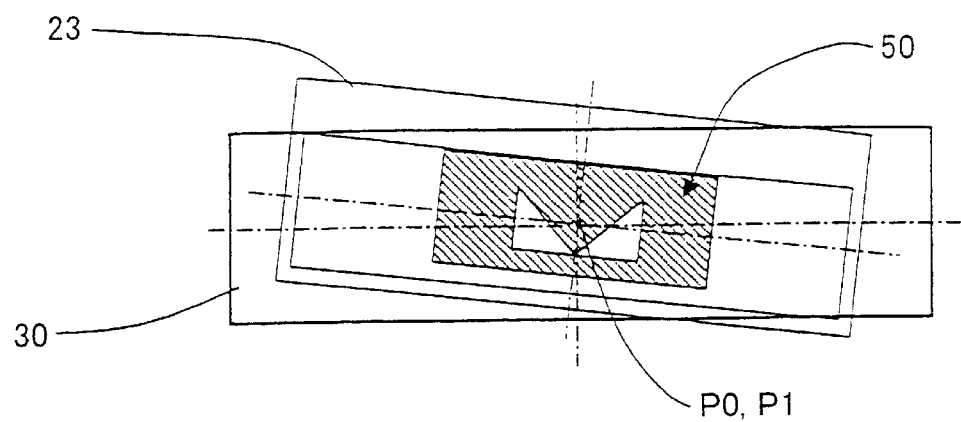
FIG. 18 is a diagram explaining an effect of the present invention.

As is shown in FIG. 18, the amount $\Delta Y$ of the misalignment is used as a correcting value to position the cabinet 23 or the magnetic tape recording-playing apparatus 24. By using the correcting value, it is possible to conform the nominal sensor position P0 and the sensor detecting position P1. As a result, even if there are some shape errors on individual parts constituting the medium holding mechanism 30, the cabinet 23 and the magnetic tape recording-playing apparatus 24 and there arises the unevenness at the assembling of the parts, the carrying apparatus 22 (the medium holding mechanism 30) can insert/eject the magnetic tape cartridge 40 into/from the cabinet 23 or the magnetic tape recording-playing apparatus 24 with high accuracy.

As mentioned above, this embodiment of the present invention can additionally detect a relative position of the medium holding mechanism 30 with respect to the cabinet 23 or the magnetic tape recording-playing apparatus 24 even in just one direction rather than two of the X and the Y directions by using the line type CCD sensor 36. Thus, it is possible to perform the detection process in less time than the conventional method in which the sensor 7 needs to move in two directions X and Y.

Also, according to this embodiment of the present invention, by using the coordinate (X1, Y1) of the boundary point P between the first white part 51 (or the second white part 52) and the black part 53, it is possible to compute the amount the $\Delta Y$ of the misalignment in the geometrical manner, whereby the $\Delta Y$ can be obtained by the simple and time-saving computation.

According to this embodiment of the present invention, the first white part 51 and the second white part 52 are formed as right isosceles triangles. However, it is not necessary to restrict the shapes thereof to right isosceles triangles. Other shapes may be used for the first white part 51 and the second white part 52. FIGS. 19A through 19H show other shapes thereof that are applicable to the present invention.

Figure 19A:
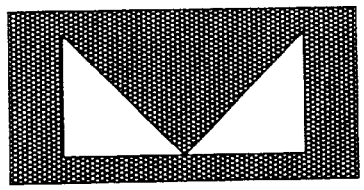
FIGS. 19A through 19H are diagrams illustrating variations of the flag.
Figure 19B:
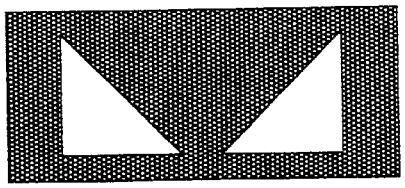
Figure 19C:
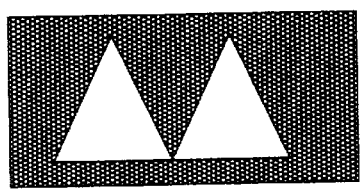
Figure 19D:
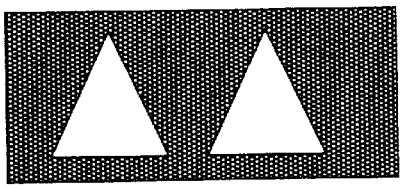
Figure 19E:
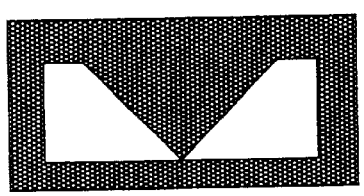
Figure 19F:
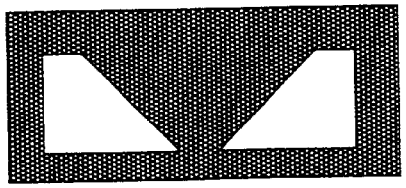
Figure 19G:
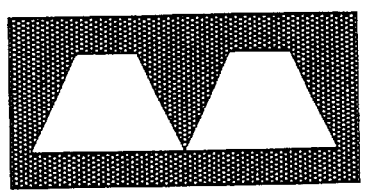
Figure 19H:
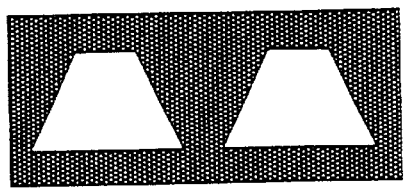

FIG. 19A shows the configuration used in this embodiment of the present invention in which the first and the second white parts are in contact. Instead of such configuration, the right isosceles triangles may have no contact, as is shown in FIG. 19B. Also, instead of right isosceles triangles, simple isosceles triangles may be used as is shown in FIGS. 19C and 19D.

Furthermore, as is shown in FIGS. 19E through 19H, the first and the second white parts may be formed as trapezoids resulting from cutting a portion of right isosceles triangles or simple isosceles triangles.

According to this embodiment of the present invention, it is noted that although the amount ΔY of misalignment in the Y direction is corrected, misalignment in the rotational direction remains. However, even in the case in which the misalignment in the rotational direction is caused by slight defects such as the shape errors of parts or the unevenness involved in assembling the parts, if the CCD detection line L1 is formed so as to pass through the flag center P0, it is rare that the claw part 38 of the holding arms 37 cannot interlock the receiving part 41 of the magnetic tape cartridge 40.

It also is noted that misalignment in the X direction is not corrected according to this embodiment of the present invention. If the misalignment is corrected in the Y direction, the CCD detection line L1 can pass through the flag center P0. As a result, it is possible to position the cabinet 23 and the medium holding mechanism 30 with high accuracy. However, by selecting shapes of the white parts 51 and 52 appropriately, it is possible to correct the misalignment in the X direction.

The present invention is not limited to the specifically disclosed embodiments, and variations and modifications may be made without departing from the scope of the present invention.

The present application is based on Japanese priority application No. 2002-253146 filed Aug. 30, 2002, the entire contents of which are hereby incorporated by reference.

What is claimed is:

1. A position detecting apparatus for detecting a relative position of a measuring member to a measured member, comprising:
  a flag provided in said measured member, the flag including a first area having first optical characteristics and a second area having second optical characteristics different from the first optical characteristics;
  a sensor detecting optically said first area and said second area of said flag and further detecting a relative position,
  wherein said first area is formed as a pair of triangles or trapezoids that are positioned symmetrically with respect to an axis of the flag, and said sensor is adapted to detect said flag linearly, and wherein said position detecting apparatus is adapted to detect said relative position of said measuring member to said measured member based on a coordinate of a boundary position between said first area and said second area in a linear track detected by said sensor.

2. The position detecting apparatus as claimed in claim 1, wherein said sensor is a line type solid-state image sensing device.

3. A library apparatus comprising:
  a medium storage cabinet storing a medium;
  a recording-playing unit performing a recording-playing process on said medium;
  a carrying mechanism carrying said medium between said medium storage cabinet and said recording-playing unit; and
  a position detecting apparatus for detecting a relative position of a measuring member to a measured member, comprising: a flag provided in said measured member, the flag including a first area having first optical characteristics and a second area having second optical characteristics different from the first optical characteristics; a sensor detecting optically said first area and said second area of said flag and further detecting a relative position, wherein said first area is formed as a pair of triangles or trapezoids that are positioned symmetrically with respect to an axis of the flag, and said sensor is adapted to detect said flag linearly, and wherein said position detecting apparatus is adapted to detect said relative position of said measuring member to said measured member based on a coordinate of a boundary position between said first area and said second area in a linear track detected by said sensor,
  wherein said flag is provided either in said medium storage cabinet or said recording-playing unit, and said sensor is provided in said carrying mechanism.

4. The library apparatus as claimed in claim 3, wherein said sensor is provided adjacent to a medium holding mechanism for holding said medium carried by said carrying mechanism.

5. A library apparatus comprising:
  a plurality of medium storage parts in which a medium is stored, inserted and ejected;
  a carrying mechanism carrying said medium among said medium storage parts;
  a mark part providing a mark at a fixed position of said medium storage parts for detecting alignment of said medium storage parts;
  a sensor provided in said carrying mechanism and detecting said mark by scanning linearly; and
  a control part detecting an amount of misalignment from a normal position of said mark,
  wherein said mark detected by said sensor is defined by two boundaries, said boundaries being positioned symmetrically with respect to an axis of the mark part in a direction orthogonal with respect to a scanning direction of said sensor so that distances regarding said two boundaries vary continuously so as to detect said distances at a position different from an orthogonal direction with said scanning direction of said sensor, and wherein said control part detects said amount of misalignment from said normal position of said mark based on said distances regarding said two boundaries.

6. A library apparatus comprising:
  a plurality of medium storage parts in which a medium is stored, inserted and ejected;
  a carrying mechanism carrying said medium among said medium storage parts;
  a mark part providing a mark at a fixed position of said medium storage parts for detecting alignment of said medium storage parts;
  a sensor provided in said carrying mechanism and detecting said mark by scanning linearly; and
  a control part detecting an amount of misalignment from a normal position of said mark and controlling a carrying position of said carrying mechanism, wherein said mark detected by said sensor is defined by two boundaries, said boundaries being positioned symmetrically with respect to an axis of the mark part in a direction orthogonal with respect to a scanning direction of said sensor so that distances regarding said two boundaries vary continuously so as to detect said distances at a position different from an orthogonal direction with said scanning direction of said sensor, and wherein said control part detects said amount of misalignment from said normal position of said mark and controls said carrying position of said carrying mechanism based on said distances regarding said two boundaries.

7. The library apparatus claimed in claim 6, wherein said carrying mechanism interlocks, holds and carries a medium among a plurality of said medium storage parts, and said control part corrects a relative position of said carrying mechanism to said medium based on said amount of misalignment.

\* \* \* \* \*